United States Patent [19]
Meek

[11] Patent Number: 4,469,122
[45] Date of Patent: Sep. 4, 1984

[54] MODULAR CHECK VALVE
[75] Inventor: Robert K. Meek, Norman, Okla.
[73] Assignee: Prince Valve, Inc., Oklahoma City, Okla.
[21] Appl. No.: 301,745
[22] Filed: Sep. 14, 1981

Related U.S. Application Data
[63] Continuation-in-part of Ser. No. 259,694, May 1, 1981, abandoned.

[51] Int. Cl.³ .................. F16K 15/00; F16K 43/00
[52] U.S. Cl. .................................. 137/312; 137/315; 137/329.01; 137/454.5; 137/527.8; 248/62; 251/143; 251/298; 285/61; 285/89; 285/212; 285/330; 285/354
[58] Field of Search ............... 137/315, 312, 343, 372, 137/329, 329.01, 454.2, 454.5, 527, 527.2, 527.6, 527.8; 248/58, 62; 251/143, 148, 152, 298; 285/13, 14, 61, 89, 212, 220, 264, 330, 354, 419

[56] References Cited
U.S. PATENT DOCUMENTS

| | | | |
|---|---|---|---|
| 1,275,697 | 8/1918 | Joyce | 137/329.01 |
| 1,453,978 | 5/1923 | Holmberg | 137/454.5 |
| 1,536,869 | 5/1925 | Kizer | 137/527 |
| 1,772,086 | 8/1930 | Porter | 137/454.2 |
| 1,819,754 | 8/1931 | Mott | 248/62 |
| 2,323,099 | 6/1943 | Patten | 285/14 |
| 2,333,243 | 11/1943 | Glab | 285/330 |
| 2,454,072 | 11/1948 | Long | 137/527.8 |
| 2,610,028 | 9/1952 | Smith | 285/14 |
| 2,960,353 | 11/1960 | Woodling | 285/89 |
| 3,198,555 | 8/1965 | Johnson et al. | 285/330 |

FOREIGN PATENT DOCUMENTS
2056623 3/1981 United Kingdom ............. 137/527.8

Primary Examiner—George L. Walton
Attorney, Agent, or Firm—Hubbard, Thurman, Turner & Tucker

[57] ABSTRACT

A fluid check valve having a cylindrical tubular body member which is symmetrical and is adapted to receive a pair of opposed head members which have suitable coupling ends formed thereon. The head members may be threaded on to the body or secured to the body with pins that prevent transmission of uncoupling torque to head retaining nuts engaged with the body. A valve closure disc is mounted on a removable support ring retained in a counterbore formed in the valve body by one of the head members. A valve seat surface may be integrally formed on a transverse face of one or both of the head members or may be provided as a separate seat insert threadedly mounted on the head members. The head members may be interchanged to accommodate particular coupling arrangements. The seat surface on the downstream head member is protected by a removable wear ring, or a removable wear ring insert is mounted in the head member in place of the seat insert.

26 Claims, 10 Drawing Figures

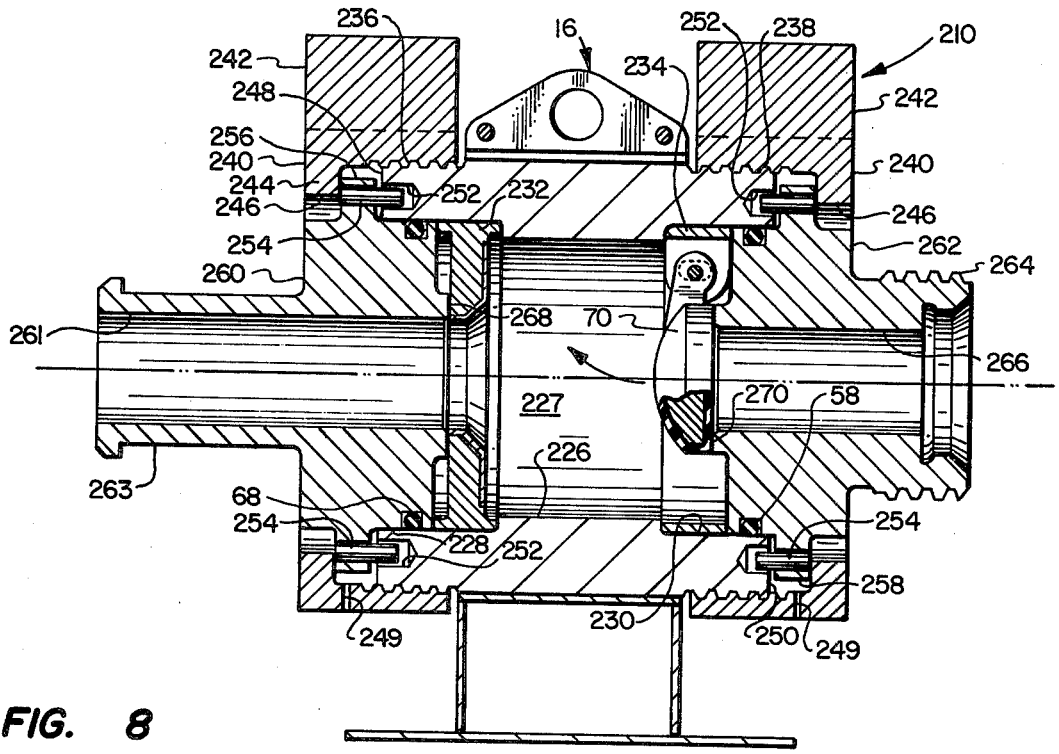
FIG. 8
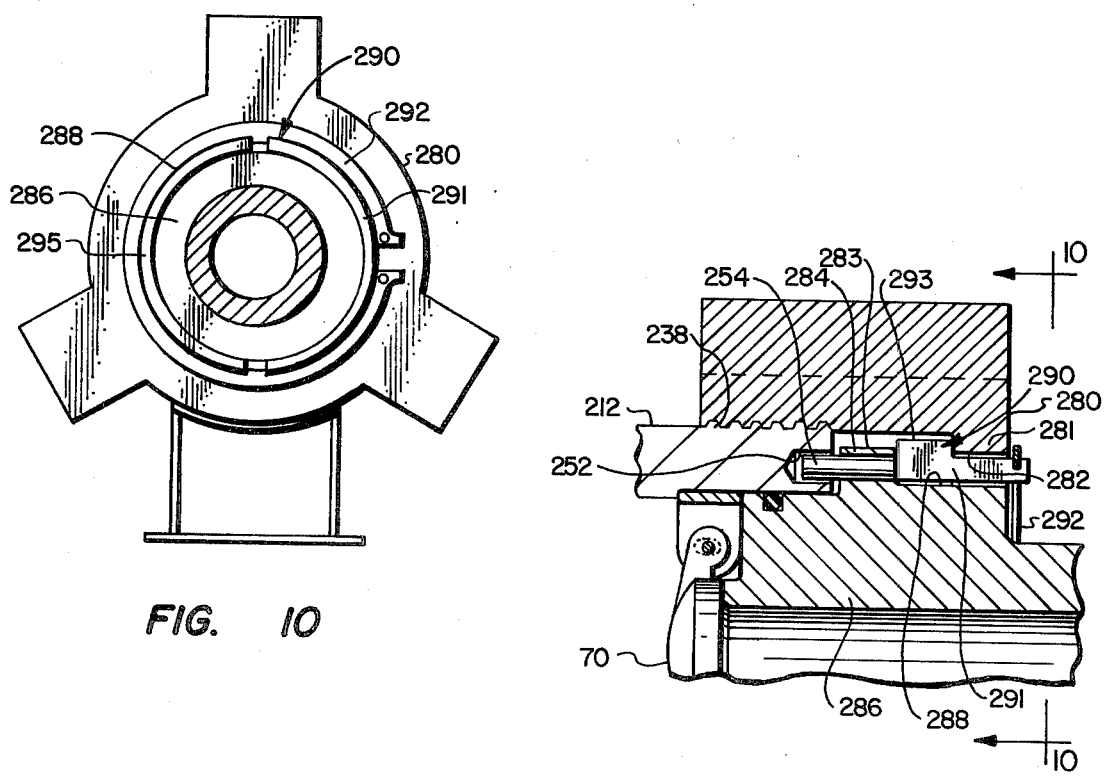
FIG. 10
FIG. 9

MODULAR CHECK VALVE

This is a continuation-in-part of application Ser. No. 259,694, filed: May 1, 1981, now abandoned.

BACKGROUND OF THE INVENTION

1. Field of the Invention

The present invention pertains to a modular check valve particularly adapted for high pressure fluid service and characterized by a swinging disc closure member mounted within a generally cylindrical tubular body having interchangeable end or head members.

2. Background Art

In the art of fluid handling devices a number of inventions have been developed pertaining to so called one way or check valves for preventing reverse flow of fluids in a conduit. One type of valve which has been found suitable for fairly large diameter conduits and relatively high flow rates is known as a so called swing type check valve comprising a generally disc shaped closure member which is pivotally mounted on an arm for movement between an open through flow position and a closed position wherein the disc is seated against a valve seat arranged generally perpendicular to the direction of flow. A number of different swing type check valves have been developed for various types of service. However, there is an increasing demand for valves which are capable of operating in systems wherein fluid pressures may range as high as several thousand pounds per square inch. When the service requirements include the capability of operating at relatively high pressures particular problems must be dealt with in the design of swing type check valves and the like. These problems are further aggravated for valves used in certain specialized applications such as, for example, the pumping of highly abrasive and/or corrosive fluids such as are used in certain stimulation and recovery procedures for subterranean hydrocarbon deposits.

It has been determined that in the development of swing type check valves for high pressure applications and severe service conditions such as are encountered in fluid systems for stimulating recovery of underground petroleum deposits that it has been desirable and necessary to abandon known design concepts for both the valve body and seat components. For example, it has been determined that conventional cast or forged valve bodies having removable access covers or other structural features which create an unsymmetrical shape are disadvantageous in that stress raisers are formed which cannot be tolerated under the aforementioned severe operating conditions. It is particularly difficult to obtain cast bodies which are free of defects or material porosity so as to be suitable for high pressure operation. Moreover, for valves used with volatile or corrosive fluids it is also necessary to minimize the number of potential leakage points in the valve body which are formed by removable covers, inspection ports or valve pivot pin bores, for example.

Accordingly, the needs associated with high pressure applications of swing type check valves, and in particular, applications involving abrasive and/or corrosive fluids have presented new problems which have heretofore been unresolved. Not only have extreme service requirements presented new problems but the need to provide interchangeability of parts for field replacement or repair, and the need to provide a modular design which may be easily adapted to different types of conduit coupling arrangements have further complicated the requirements for swing type check valves which are economical to produce and yet capable of performing under rigorous service conditions.

SUMMARY OF THE INVENTION

The present invention provides an improved swing type check valve particularly adapted for high pressure applications to fluid systems wherein the deficiencies of nonsymmetrical valve body designs as well as the lack of interchangeability of parts and ease of service and replacement have been overcome in a design which is economical to produce and reliable in operation.

In accordance with one aspect of the invention there is provided a swing type check valve which has a main body member which has a uniform and generally symmetrical configuration with respect to the central axis of the valve assembly whereby areas of stress concentration has been eliminated. In the improved valve design of the present invention the valve body as well as opposed removable head or end members may be fabricated from rolled or extruded high strength metals such as alloy steel thereby eliminating the problems associated with using castings, in particular, as well as forgings for these fluid handling members which are subject to relatively high pressures and other severe operating conditions. In one preferred embodiment of the present invention a swing type check valve is formed having a generally tubular alloy steel body with removable end or head members which are threadedly coupled to the body and are interchangeable to meet particular requirements of service as regards coupling arrangements to pipes and other fluid handling apparatus.

In accordance with another important aspect of the present invention there is provided a swing type check valve having a body with no openings therein other than the opposite ends which are adapted to threadedly receive removable head members and wherein a fluid seal between the body and the head members may be formed by conventional means such as o-rings or other conventional seal members. Accordingly, with the check valve design of the present invention the problems associated with defective castings and to a lesser extent forgings in prior art valves have been eliminated, and the number of potential fluid leakage points are minimized.

In accordance with yet another important aspect of the present invention there is provided a swing type check valve having interchangeable head or end members which may be formed to include the valve seat or provided with a removable seat insert. The valve closure member or disc is pivotally mounted on a separate hanger or support member which is not subject to high stresses or pressure differentials and is not part of the larger and more expensive head or end member. The valve head members may be provided with a variety of coupling configurations and may be interchanged at will to make the valve more readily adaptable to various types of piping systems.

In one embodiment of the present invention the valve seat is formed as an integral surface on the head member, which surface may be part of the material of the head member or be built up using hard surfacing material such as Stellite, for example. In accordance with another embodiment of the invention the valve seat element may be formed as a removable insert threadedly mounted on the head member but separate from the valve disc support member. In yet a third embodiment the valve seat and disc support may be formed as a single member removably mounted on the head member.

The present invention still further provides for an improved swing type check valve wherein a replaceable wear ring may be provided downstream of the valve seat and disc to protect the end face of the downstream head member which may also serve as a valve seat surface if the heads are interchanged or, alternatively, the closure disc and pivot support member are interchanged with the wear ring. Accordingly, the support member for the valve disc is dimensioned to fit in the same space between the head member and the valve body as the removable wear ring. The wear ring as well as the seat and/or closure member may be coated with abrasion resistant material such as rubber or faced with relatively hard wear resistant material such as ceramics or other wear resistant compositions. Moreover, the design of the valve body lends itself to the easy use of fixed or replaceable liners or inserts for improved life of the body in use with highly abrasive fluids.

In accordance with still another aspect of the check valve of the present invention there is provided an improved locking connection for reducing the tendency for the threaded end or head members to become disconnected from the valve body during makeup or breakdown of the associated piping or other elements connected to the valve. In one preferred embodiment the inventive check valve is provided with a locknut which is threadedly engaged with cooperating threads on the head member and is provided with an annular collar having a sloping surface engageable with a cooperating surface formed on the valve body. Upon forcible engagement of the locknut with the body the annular collar is elastically deflected radially inward to provide forcible engagement between the cooperating threads on the locknut and the head members to prevent unthreading of the head members from the body. The sloping surface is delimited by a transverse end face which is dimensioned to assure that the collar is deflected radially inward and not primarily axially deflected to cause forcible engagement between the threads of the locknut and the head member. The locknuts are preferably provided with a plurality of radially extending lugs for use in tightening or loosening operations.

In accordance with another preferred embodiment the valve head members are secured to the body by nuts and by axially projecting pins which prevent rotation of the head members with respect to the body. Accordingly, during coupling or uncoupling operations for installing or removing the valve or other components in a pipe system unwanted loosening of the retaining nuts is avoided. Moreover the retaining nuts may be adapted through a split lock ring arrangement for removal from the head members without removal of the head members from the pipe system or when the head members are provided with large diameter coupling portions.

Yet another feature of the present invention is provided by an arrangement of relatively small fluid bleed ports arranged in the valve body for draining fluid which might leak past the seal points between the valve body and the head members to thereby prevent any pressure build up or substantial incursion of fluid into the cooperating threads on the body and the head member, respectively.

Those skilled in the art of check valves and the like will appreciate that the present invention presents a number of advantages which have heretofore been unrealized in the art of check valves adapted particularly for high pressure applications. In particular, the unique and superior check valve of the present invention has a body which may be fabricated of material which is less likely to leak or fail from material defects or stress concentrations, is easily fabricated and has a minimum number of fluid leakage points. The check valve of the present invention has a high degree of interchangeability of parts making it suitable for many different applications. The design of the connections between the body and head members and the means for retaining the head members on the body provide for easy serviceability in the field. Those skilled in the art will further appreciate the superiority of the check valve of the present invention upon reading the detailed description which follows.

BRIEF DESCRIPTION OF THE DRAWINGS

FIG. 8 is a longitudinal central section view of a third alternate embodiment of the check valve of the present invention;

FIG. 9 is a detail section view of a modification of the embodiment of FIG. 8; and FIG. 10 is an end view taken from the line 10—10 of FIG. 9.

BRIEF DESCRIPTION OF THE PREFERRED EMBODIMENTS

Figure 1:
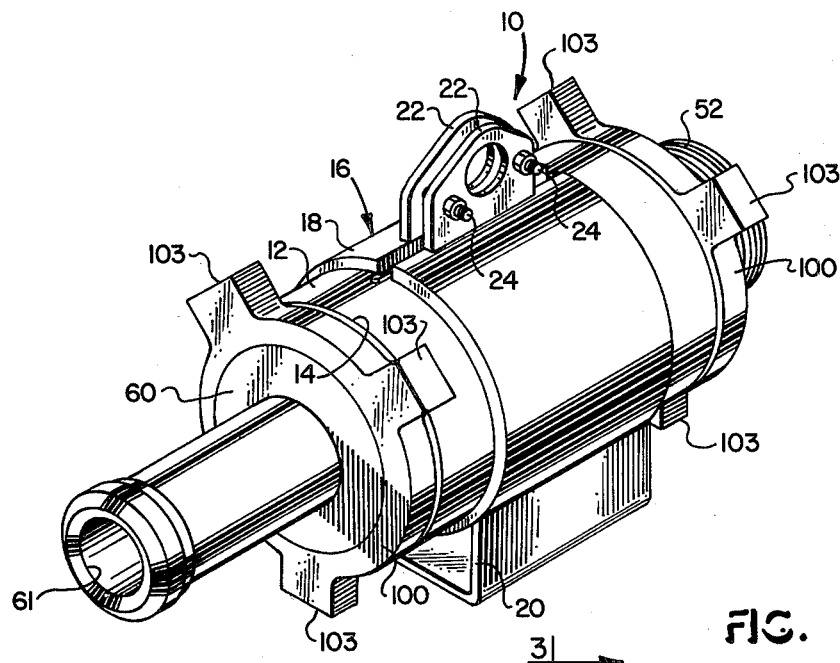
FIG. 1 is an assembly view in perspective of the complete valve assembly of one embodiment of the modular check valve of the present invention.

In the description which follows like parts are identified with the same reference numerals throughout the specification and drawings, respectively. The drawings are not necessarily to scale and in certain views the scale has been exaggerated to more clearly show the structural details.

Figure 2:
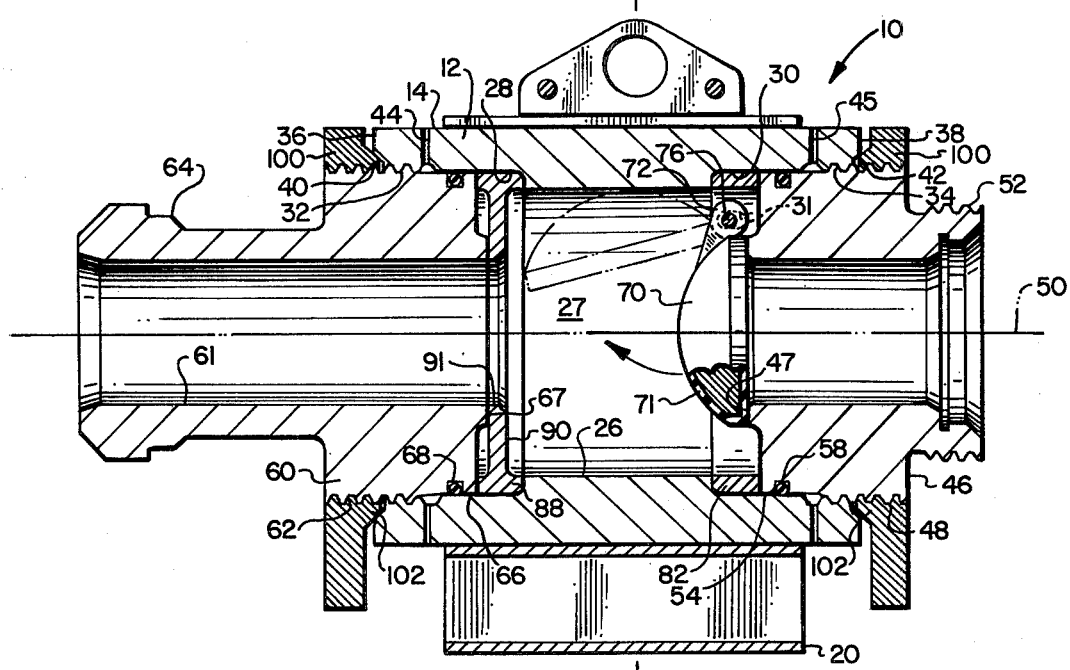
FIG. 2 is a longitudinal central section view of the valve shown in FIG. 1.

Referring to FIGS. 1 and 2, there is illustrated an improved modular check valve in accordance with the present invention and generally designated by the numeral 10. The check valve 10 is characterized by a generally cylindrical tubular body member 12 having a substantially cylindrical outer surface 14. By way of example, the type of applications to which the valve 10 may be applied require that the valve be sized for nominal pipe diameters of from two to six inches. Accordingly, the larger size valves made to the design of the present invention are heavy enough to desirably utilize a cradle or carrying member generally designated by the numeral 16. The member 16 comprises a cylindrical sleeve 18 to which is welded a generally rectangular base member 20. Lifting brackets 22 are suitably fixed to the ring 18 adjacent an axial gap formed in the ring and are suitably drawn together to clamp the ring to the exterior of the valve body 12 by spaced apart bolt and nut assemblies 24. The cradle 16 may be easily slipped on and off the exterior of the body 12 by removing the bolt and nut assemblies 24.

Referring now particularly to FIG. 2 of the drawings, the body member 12 includes an interior bore 26 and opposed counterbores of greater diameter 28 and 30. The body member 12 also includes axial threaded portions 32 and 34 which extend toward opposed end faces 36 and 38, respectively. The opposite end faces 36 and 38 are provided with relatively shallow recesses formed by sloping sidewalls 40 and 42, respectively. The body member 12 may also be provided with one or more fluid bleed passageways 44 and 45 which open, respectively, into an undercut portion between the threads 32 and 34 and the respective counterbores 28 and 30.

As will be appreciated from the foregoing description the body member 12 is substantially symmetrical about the longitudinal center line 50 as well as being symmetrical with respect to a plane perpendicular to the centerline and passing through the body midway between the end faces 36 and 38. The body 12 is conveniently formed from tube or bar stock of high alloy steel such as, for example, AISI 4140 or 4340 which is widely available in billets as well as hot rolled and cold rolled finished bars or extruded tubes. Those skilled in the art will appreciate that other alloy metals may be used in place of the specific steel alloys indicated herein.

The check valve 10 is further characterized by an inlet head comprising a generally cylindrical member 46 having external threads 48 which are cooperable with the threads 34 or 32 so that the member could be threaded into either end of the body member 12. The head 46 is provided with a main bore 51 comprising a flow passage for fluid flowing through the valve 10. The head 46 also includes a reduced diameter externally threaded portion 52 which, in the particular embodiment shown, is configured to form a part of a coupling known as a union of a particular type commonly used in oil field equipment. The head 46 is also provided with a reduced diameter cylindrical portion 54 which is adapted to be closely fitted in the bores 28 or 30. An o-ring type seal member 58 is disposed in an annular groove formed in the reduced diameter portion 54.

Referring further to FIG. 2 the valve 10 includes a second head member generally designated by the numeral 60 which is also provided with an externally threaded portion 62 whereby the head member may be threadedly engaged with threaded portion 32 of the body 12 as shown. The head member 60 includes an internal passage 61 which opens to each end of the head and is aligned with the passage 51 and the member 46. The head member 60 is provided with a coupling portion 64 which may be adapted to conform to various standard coupling designs and in the particular configuration shown is the opposite half of the aforementioned oil field type union coupling. Alternatively, the coupling portions 52 and 64 could be configured to have external or internal threads, for example, or could be formed to comprise part of a number of different coupling arrangements known in the art of pipe and tube couplings including flanged ends, butt weld ends and swivel ends. The head member 60 is also formed to have a slightly reduced diameter portion 66 which is adapted to the closely fitted in either of the bores 28 or 30. Moreover, the head member 60 is also provided with an o-ring seal 68 disposed in an annular groove formed in the cylindrical portion 66.

As will be appreciated viewing FIG. 2, the ends of the respective members 46 and 60 facing inwardly toward an internal flow passage 27 formed by the bore 26 may comprise respective seat surfaces 47 and 67 which are adapted to be engageable by a valve closure member or disc 70. In the particular configuration of the valve 10 shown in FIG. 2 the closure disc 70 is arranged to be in engagement with the seat surface 47 to prevent fluid flow from the bore 61 through the flow passage 27 and into the bore 51. The closure disc 70 is of a generally cylindrical configuration having a cross sectional shape of a somewhat half oval or elliptical profile to provide adequate strength to resist deflection due to the fluid pressures acting thereon when the closure disc is seated against the surface 47. The closure disc 70 is, in the preferred embodiment shown, provided with an elastomeric coating 71 disposed over the entire surface thereof and in particular against the planar surface which engages the seat 47. The closure disc 70 is also provided with a radially projecting lug 72 having a bore formed therein in which a pivot pin 76 is disposed for supporting the closure disc for swinging movement between an open and closed position as illustrated by the respective phantom and solid lines designating the closure disc 70 in FIG. 2.

Figure 3:
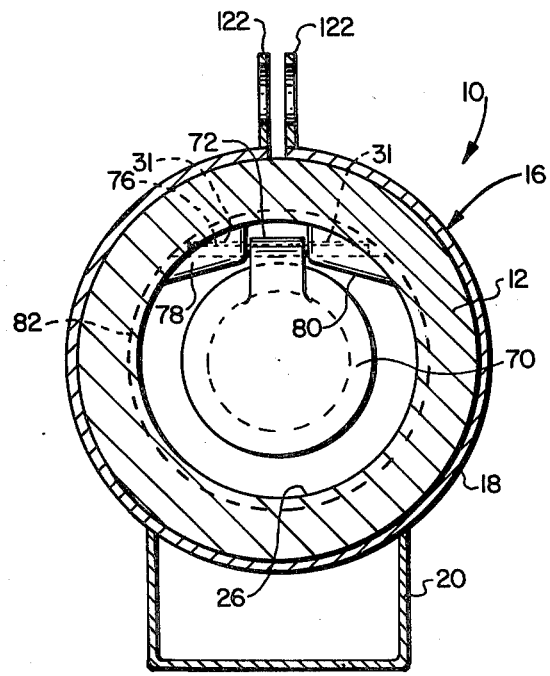
FIG. 3 is a transverse section view taken along the line 3—3 of FIG. 2.

As shown in FIG. 3, the closure disc support lug 72 is disposed between two opposed bosses 78 and 80 formed on an annular support ring generally designated by the numeral 82. The support ring 82 is adapted to be closely fitted in the bore 30 against the shoulder formed between the bore 30 and the bore 26 and is secured in place by the head member 46 as illustrated. The bosses 78 and 80 are provided with suitable elongated slots 31 for receiving the pivot pin 76, as shown in FIG. 2 and FIG. 3, to allow the disc 70 to translate axially a short distance to assure uniform engagement with the seat 47 and to accommodate some compression of the coating 71 under fluid pressure acting on the disc. Referring again to FIG. 2 the valve 10 is also provided with a cylindrical ring member 88 having a transverse web portion 90 in which a bore 91 is formed of approximately the same diameter as the bore 61. The ring member 88 is provided primarily to serve as a wear ring to protect the seat surface 67 of the head 60. The ring member 88 is preferably of the same cross sectional or axial thickness as the support ring 82 so that these members may be interchangeably fitted in either of the bores 28 or 30 depending on the preferred assembly of the valve 10. By providing the ring member 88 the seat surface 67 is protected against abrasion or wear when the valve 10 is used with highly abrasive fluids such as the types of fluids used in various subterranean fracturing operations performed for the recovery of crude oil and the like.

As will be appreciated from the foregoing description the head members 46 and 60 may be interchanged to accommodate particular coupling arrangements of the piping or equipment with which the valve 10 is to be used. Moreover, in the event that, for example, the seat surface 47 should become worn or damaged the head members 46 or 60 could be interchanged to provide a usable seating surface for the closure disc 70. The head members 46 and 60 are preferably made of alloy steel of the same or a similar grade as the body member 12. Moreover, the seat surfaces 47 and 67 can be provided with a hardened surface or coated with a wear resistant material such as a cermet or Stellite type coating. Furthermore, if the wear ring 88 should become badly worn so that the seat surface 67 became exposed to fluids flowing through the valve 10 the wear ring itself could be easily replaced to continue protection of the seat surface 67, for example.

Figure 4:
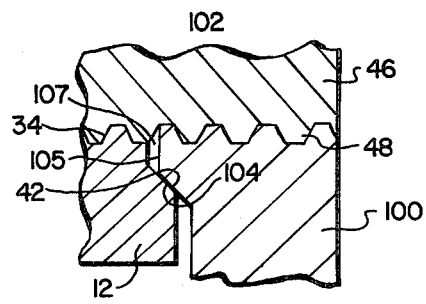
FIG. 4 is a detailed section view on a larger scale than FIG. 2 showing the cooperating surfaces between the head member locknut and the valve body member.

Referring to FIGS. 2 and 4 the head members 46 and 60 are secured in a lock relationship with the body member 12 to prevent unwanted disassembly of the valve during make up and breakdown operations of the rest of the piping assembly with which the valve is being used. The head members 46 and 60 may be more or less hand tightened in the assembled positions shown whereupon they may be locked by respective threaded locknuts 100 which are adapted to be threadedly engaged with the respective threaded portions 48 and 62 on the head members. The locknuts 100 are provided with axially projecting conically tapered collar portions 102 having a conical surface 104 engageable with the cooperating surfaces 40 and 42 formed in the end faces 36 and 38 of the body 12. In order to assure radial inward deflection of the collar portions 102 the transverse end face 105 of the collar portions is dimensioned so that a clearance space 107 is provided, as shown in FIG. 4, and the end face does not bottom against the body 12. Accordingly, upon assembly of the locknuts 100 the surfaces 104 become forcibly engaged with the surfaces 40 and 42 whereby the threads formed on the distal end of the portions 102 tend to be deflected radially inwardly into tight gripping engagement with the threads on the respective head members 46 and 60. The radial inward deflection of the portions 102 together with the axial elastic elongation of the threaded portions of the head members provide a substantially tight threaded connection between the head members and the body member 12 to prevent disengagement of the head members from the body member. As shown in FIG. 1, the locknuts 100 are provided with three equally spaced and radially projecting lugs 103 whereby the nuts may be engaged by a suitable tool for tightening and loosening the nut with respect to the head members.

As will be appreciated from the foregoing description of the check valve 10 a number of advantages have been provided by the present invention. The valve body and head members are preferably of axially symmetrical, uniform shape which do not require casting or forging to be economically produced. Moreover, the uniform cylindrical construction of the body reduces any points of stress concentration and the overall valve construction reduces the number of points which must be sealed with respect to the exterior of the valve to prevent leakage of fluid. The arrangement of the head members 46 and 60 being provided with conventional o-ring seals 58 and 68, respectively, provides for sealing the chamber 27 in a conventional manner which is reliable and easy to accomplish from a design standpoint. Moreover, the provision of the bleed holes 44 and 45 between the o-ring seals 68 and 58, respectively, and their respective threaded portions 34 and 32 minimizes the chance of fluid being forced into the threaded areas between the head members and the body member and also reduces the chance of fluid pressure building up in the threaded region if the seals 58 or 68 should allow some leakage.

The modular construction of the valve 10 is also advantageous in that the head members 46 and 60 may be interchanged to accommodate the coupling arrangements of a particular pipe system in which the valve is being installed. Moreover, the provision of the valve support ring 82 and the removable wear ring 88, which are also interchangeable in regard to their positions within the valve body enhances the repairability and interchangeability of the valve assembly. Although the closure disc 70 could be provided without the elastomeric protective coating and the coating could be provided instead on the seat 47 it has been determined that it is preferred to provide the coating on the closure disc since it is exposed to the relatively high velocity flow stream being conducted through the bore 51, the passage 27 and the bore 61. The valve 10 is also easily assembled and disassembled thanks to the arrangement of the threaded head members 46 and 60 and the particular configuration of the locknuts 100 which are forcibly engageable with the body member 12 in a unique arrangement.

Figure 5:
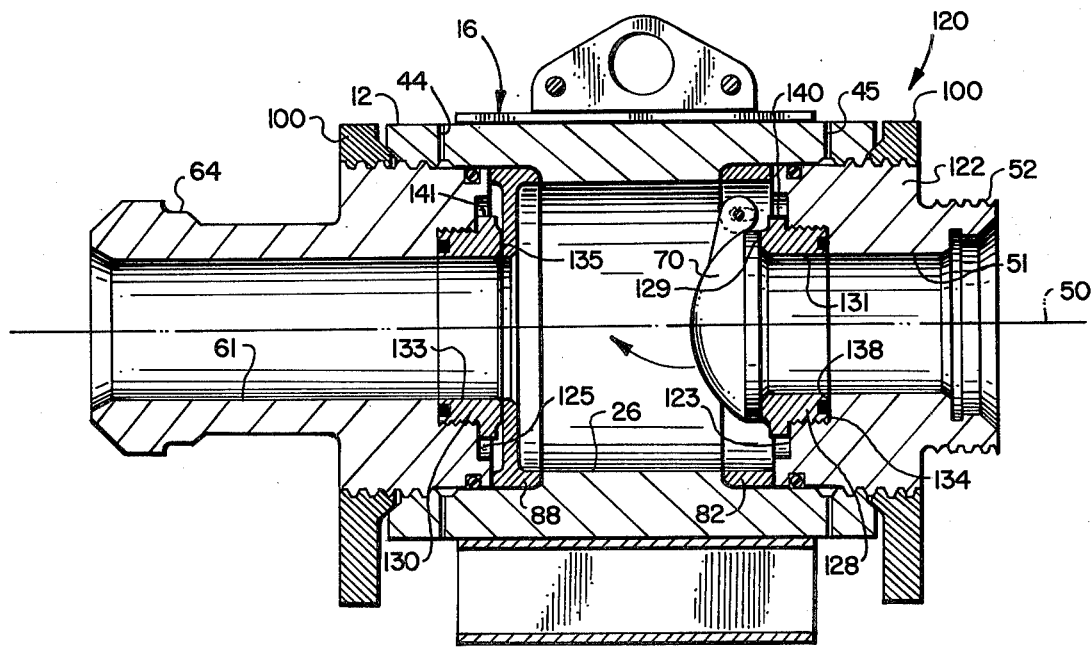
FIG. 5 is a longitudinal central section view of an alternate embodiment of the present invention.

Referring to FIG. 5 there is illustrated an alternate embodiment of a check valve in accordance with the present invention and generally designated by the numeral 120. The valve 120 is similar in most respects to the valve 10 but includes removable head members 122 and 124 which are configured similar to the head members 46 and 60, respectively, but are adapted to have substantially identical removable valve seat inserts 128 and 130, respectively. The seat insert 128 is provided with an axially projecting externally threaded portion 132 having a transverse end face 134. The end face 134 is provided with an annular groove in which an O-ring 136 is disposed and is adapted to be in sealing engagement with the bottom wall 138 of a cooperating threaded bore formed in the head member 122. The seat inserts 128 and 130 are provided with axial through passages or bores 131 and 133, respectively, which are aligned with the bores 51 and 61. The inserts 128 and 130 are also provided with transverse valve seat surfaces 129 and 135, respectively. The seat inserts are also provided with radially projecting flange portions 140 and 141 which may have one or more suitable recesses, not shown for receiving cooperating parts of a spanner wrench, not shown, for inserting and removing the seat inserts with respect to the head members. The head members 122 and 124 are provided with axially extending recesses 123 and 125, respectively, to accommodate the flanges 140 of the seat insert while maintaining a proper dimensional relationship between the valve disc support ring and the seat surfaces. Accordingly, the embodiment illustrated in FIG. 5 includes all of the features of the embodiment illustrated in FIGS. 1 through 4 but additionally provides for removable valve seat inserts which may be interchanged when worn or damaged without the necessity of replacing the entire head members 122 or 124.

Figure 6:
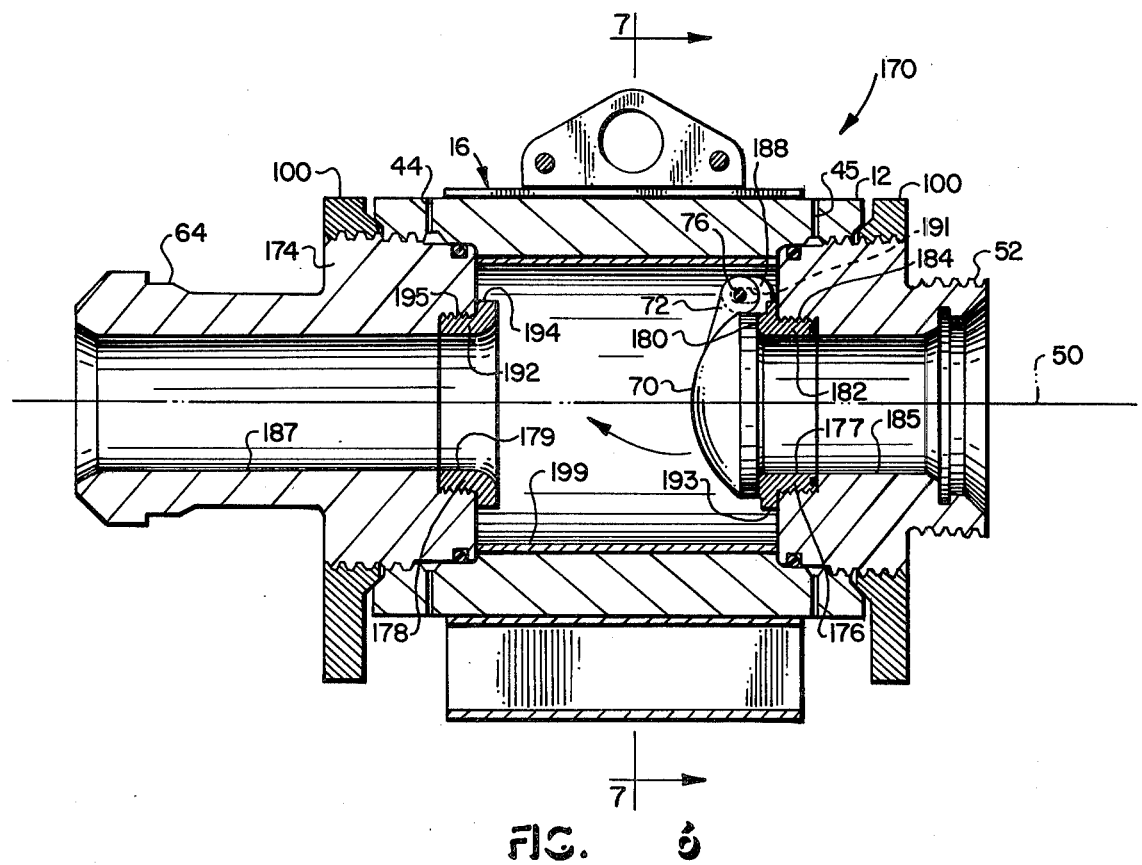
FIG. 6 is a longitudinal central section view of a second alternate embodiment of the present invention.
Figure 7:
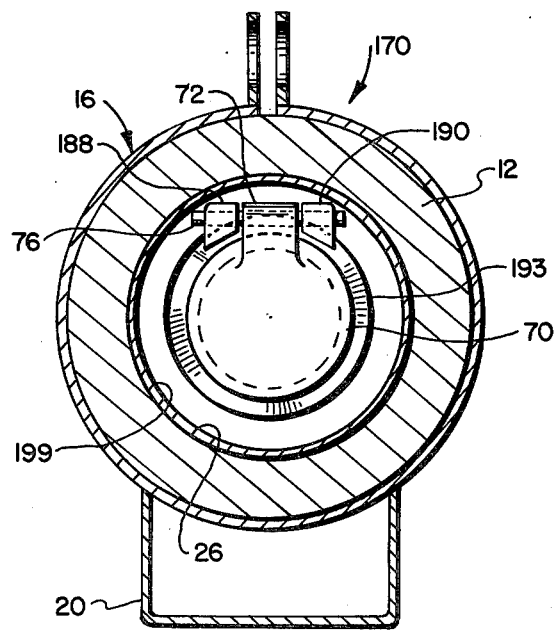
FIG. 7 is a detailed section view taken along the line 7—7 of FIG. 6.

Referring now to FIGS. 6 and 7, a second alternate embodiment of an improved check valve in accordance with the present invention is illustrated and generally designated by the numeral 170. The valve 170 includes a body member 12 and removable head members 172 and 174 similar in some respects to the head members 46 and 60 but also provided with removable portions comprising a seat insert 176 and a wear ring 178, respectively. The seat insert 176 is provided with a closure member seating surface 180 and an axially extending externally threaded portion 182 threadedly engaged in a cooperating internally threaded bore 184 formed in the head member 172. The head members 172 and 174 are also provided with axial bores or fluid flow passages 185 and 187 similar to the flow passages 51 and 61 for the head members 46 and 60. The inserts 176 and 178 include axial bores 177 and 179, respectively, which are coextensive with the passages 185 and 187. The seat insert 176 differs from the seat insert 128 in that the seat insert 176 also comprises a supporting member for supporting the closure disc 70 for pivotal movement between open and closed positions.

Referring to FIG. 7, in particular, the seat insert 176 is provided with a pair of opposed radially extending lugs 188 and 190 which are each formed to have an elongated slot 191, FIG. 6, for receiving the closure member pivot pin 76. The seat insert 176 also includes a radially extending flange portion 193 which may be provided with suitable holes or slots, not shown, to provide for insertion and removal of the member 176 with a suitable wrench. The modified head members 172 and 174 being provided, respectively, with the threaded bore portions 184 and 195 may also be interchanged to accommodate particular coupling arrangements in the piping system or equipment with which the check valve 170 is to be used. Accordingly, the wear ring 178 is provided with a threaded portion 192 and a radially extending flange 194 whereby the wear ring 178 may be inserted and removed from the head member 174 and interchanged with the seat insert 176 according to the desired arrangement of the valve 170. As shown in FIG. 6, the valve 170 may also be provided with a removable liner 199 fitted within the bore 26 of the body 12. The line 199 may be formed of a wear or abrasion resistant material and may be easily replaced as needed.

Another embodiment of the present invention is illustrated in FIG. 8 of the drawings, which embodiment is adapted to minimize or eliminate the tendency to unscrew the head retaining nuts when the valve is being installed in a pipe system or other components are being added to or broken out of the pipe system. Referring to FIG. 8, there is illustrated in longitudinal central section a modular check valve generally designated by the numeral 210 comprising a cylindrical body 212 supported by a support bracket 16. The body 212 is internally configured similar to the body 12 of the embodiment of FIG. 1 and includes a central bore 226, as well as opposed counter bore portions 228 and 230. The counter bore portions 228 and 230 are adapted to interchangeably receive a wear ring 232 and a closure disc support ring 234 similar to the support ring 82. The support ring 234 is adapted to pivotally support a closure disc 70 in the same manner as the support ring 82 supports the disc 70.

The valve body 212 includes opposed externally threaded portions 236 and 238 which are adapted to be threadedly engaged with nuts 240, as illustrated in FIG. 8. The nuts 240 include respective radially projecting lugs 242, one shown, similar to the lugs provided on the nuts 100. The locknuts 240 are each provided with a radially inwardly projecting flange 244 having an inner diameter 246 defining a circular opening in the nut. The nuts 240 also include suitable drain passages 249 provided for draining fluid which may leak from the interior of the valve body.

The body member 212 of the valve 210 also includes opposed end faces 248 and 250 in which a plurality of pin bores 252 are formed for receiving axially projecting cylindrical pins 254, as shown in FIG. 8. The pins 254 are also fixed in bores formed in circular flanges 256 and 258 of the respective valve head members 260 and 262. The head member 260 includes a central bore 261 opening into the interior chamber 227 of the body 212. The head member 260 may be configured to have a coupling portion 263 similar to the coupling portion 64 for the head member 60. Alternatively, the head member 260 may be provided with other coupling configurations including internal or external threaded portions or an integral flange portion, for example. The head member 262 includes an external threaded coupling portion 264 and an axial bore 266 opening into the chamber 227 when the valve closure disc is biased in the open position. The head members 260 and 262 also include integral annular seat surfaces 268 and 270, respectively, which may be formed similar to the seat surfaces 67 and 47 for the head members 60 and 46 of the embodiment of the check valve shown in FIG. 2. The head members 260 and 262 may, of course, also be configured to have removable valve seat inserts or the like in accordance with the teaching of the present invention.

As illustrated in FIG. 8, the head members 260 and 262 are adapted to be retained in the bores 228 and 230 in sealing engagement therewith and for retention of the rings 232 and 234, respectively. Moreover, the inwardly projecting flanges 244 on the nuts 240 are dimensioned to engage the flange portions 256 and 258 for retaining the head members in assembly with the valve body 212, as illustrated. However, by providing the head members 260 and 262 with the axially projecting pins 254 engageable with the body 212, as illustrated, any torque exerted on the head members in coupling or decoupling the valve 210 from a piping system would not tend to loosen the nuts 240 since the torque exerted on the head members would be transmitted directly to the body 212 through the pins. Moreover, in tightening or loosening the nuts 240 with respect to the body 212, a torque exerted on the head members 260 and 262 would also be transmitted directly to the body 212. Although two pins 254 and cooperating pin bores 252 are illustrated in the embodiment shown in FIG. 8, it will be appreciated by those skilled in the art that a circular pattern of pin bores 252 may be provided so that the coupling heads 260 and 262 may be oriented in more than two alternate positions rotatably with respect to the central longitudinal axis of the valve 210. Alternatively, additional bores could be provided in the flanges 256 and 258 for the pins 254 so that the pins could be selectively placed with respect to the flanges. Those skilled in the art will appreciate that the configuration of the head members and the retaining nuts of the valve 212 provides an improvement wherein torques exerted on the head members will not tend to loosen the nuts resulting in unwanted loosening or disassembly of the valve.

Referring to FIGS. 9 and 10, a further modification of a check valve in accordance with the present invention is illustrated. In the modification of the present invention illustrated in FIGS. 9 and 10, a modified type of retaining nut 280 is illustrated having a radially inwardly projecting flange 281 delimited by its inner diameter 282. The diameter of the flange 282 is greater than the outside diameter 283 of the circular flange 284 formed on a modified head member 286 similar to the head member 262. However, the head member 286 may be provided with a coupling portion, not shown, having a diameter greater than the inner diameter 282 of the nut 280. Accordingly, it would not be possible to assemble the nut onto the valve from the opposite end of the coupling member 286, not shown, as long as the diameter of that portion were greater than the diameter 282. In the modification shown in FIGS. 9 and 10 of the drawings, the head member 286 is provided with an axially extending enlarged diameter portion 288 around which is disposed a circular ring 290 which is longitudinally split into two portions 291 and 295 as illustrated in FIG. 10. The ring 290 is retained within the interior of the nut 280 in assembly therewith by a retaining ring 292 which may be of a conventional type as illustrated. The ring 290 includes radially projecting flange portions 293 which are engageable with a side of the flange 281 and bears against the flange 284 of the head member 286 to transmit the holding force of the nut 280 to the head member to retain it in assembly with the body 212. One or more axially projecting pins 254 are provided in the head member 286 in a manner similar to the arrangement for the head members 260 and 262.

The arrangement shown in FIGS. 9 and 10 is such that the head member 286 would have a sufficient length from the portion which extends into the bore 230 of the body 212 such that the nut 280 could be removed from the body, to the right viewing FIG. 9, beyond the position of the split ring 290, upon removal of the snap ring 292, whereby the split ring 290 could then be removed from the head member 286. Upon removal of the valve body from the head member, or vice versa, the nut 280 could then be slipped over the flange 283 and removed from the head member 286. Accordingly, with the modification illustrated in FIGS. 9 and 10, the valve may be assembled and disassembled with respect to head members having a coupling portion with a diameter larger than the diameter 282.

From the foregoing it will be appreciated that the various embodiments of the check valve of the present invention offers a number of advantages. The uniform and symmetrical body design is more reliable and minimizes the number of leakage points subject to high pressure fluid. The minimal risk of valve leakage is enhanced by the provision of the cylindrical portions of the head members which support the o-ring seals for engagement with the walls of cooperating bores in the body member. The head members, the body member and the retaining nuts are provided with cooperating machine threads, preferably of the square or stub acme configuration, for easy assembly and disassembly. The interchangeability of parts to accommodate various coupling arrangements, to reverse the directions in which flow is permitted and flow is checked and the increased serviceability provided by having valve seat surfaces formed on both head members or being insertable in both head members provide a superior valve for which there has been a long felt need particularly in applications subject to high pressure abrasive fluids. The valve is constructed of conventional alloy materials and may be easily fabricated from conventional or standard shapes of material stock. Conventional and reliable sealing members such as o-rings are used without any special configurations. The uniform and symmetrical body design is provided which has a large flow area with room to accommodate full opening of the disc closure member. The unique locking feature to prevent unthreading of the threaded head members may be easily tightened or released without special tools or even conventional wrenches.

Those skilled in the art of check valves and the like will appreciate that the foregoing advantages and inventive features may be incorporated in designs which comprise substitutions or modifications of the preferred embodiments shown without departing from the scope and spirit of the appended claims.

What I claim, is:

1. A fluid check valve comprising:

a generally cylindrical tubular body member including a central longitudinal bore defining a fluid flow passage, valve seat means disposed in said bore, a closure disc pivotally mounted within said bore and operable to be pivoted between an open position and a closed position in engagement with said seat means to prevent fluid flow in one direction through said valve, opposed internally threaded portions extending toward said bore from opposite ends of said body member and opposed generally conical surfaces formed in opposite transverse end faces of said body member;

opposed head members removably secured to said body member at opposite ends of said body member, respectively, each of said head members including a longitudinally extending flow passage adapted to be in communication with said bore and externally threaded portions cooperable with said internally threaded portions on said body member;

means on said respective head members for coupling said valve to fluid conduit means;

substantially fluid tight seal means formed between each of said head members and said body member between said bore and said threaded portions, respectively, and locknuts disposed on said externally threaded portions of said head members and including portions forcibly engageable with said conical surfaces on said body member for locking the threaded connection between said body member and said head members, respectively, said portions on said locknuts including annular axially extending collar portions including conical surfaces engageable with said conical surfaces on said body member, respectively, and delimited by transverse end faces on said collar portions dimensioned to provide for engagement between said conical surfaces on said body member and said collar portions, respectively, without engagement of said transverse end faces on said collar portions with said body member to permit radial deflection of said collar portions, respectively.

2. A fluid check valve comprising:

a generally cylindrical tubular body member including a central longitudinal bore defining a fluid flow passage;

opposed head members removably secured to said body member at opposite ends of said body member, respectively, and interchangeable in said body member, each of said head members including a longitudinally extending flow passage adapted to be in communication with said bore in said body member, and an annular valve seat surface on each of said head members and disposed in said bore;

means on said respective head members for coupling said valve to fluid conduit means;

a closure disc pivotally mounted within said bore and operable to be pivoted between an open position and a closed position in engagement with said seat surface on one of said head members to prevent fluid flow in one direction through said valve; and a generally cylindrical wear ring including a transverse web portion, said ring being removably retained in said bore by the other of said head members such that said web portion overlies said seat surface on said other head member.

3. A fluid check valve comprising:

a generally cylindrical tubular body member including a central longitudinal bore defining a fluid flow passage;

opposed head members removably secured to said body member at opposite ends of said body member, respectively, and interchangeable in said body member, each of said head members including a longitudinally extending flow passage adapted to be in communication with said bore in said body member, and an annular valve seat surface on each of said head members and disposed in said bore;

means on said respective head members for coupling said valve to fluid conduit means;

a separate support member removable from said body member for pivotally supporting a closure disc within said bore, said closure disc being operable to be pivoted between an open position and a closed position in engagement with said seat surface on one of said head members to prevent fluid flow in one direction through said valve; and a generally cylindrical wear ring including a transverse web portion, said ring being removably retained in said bore by the other of said head members such that said web portion overlies said seat surface on said other head member.

4. A fluid check valve comprising:

a generally cylindrical tubular body member including a central longitudinal bore defining a fluid flow passage;

opposed head members removably secured to said body member at opposite ends of said body member, respectively, each of said head members including a longitudinally extending flow passage adapted to be in communication with said bore in said body member;

means on said respective head members for coupling said valve to fluid conduit means;

valve seat means disposed in said bore in said body member;

a closure disc pivotally mounted within said bore and operable to be pivoted between an open position and a closed position in engagement with said seat means to prevent fluid flow in one direction through said valve; and interconnecting means including a plurality of pins projecting axially from a flange on at least one of said head members into cooperating pin receiving bores in said body member, and interconnecting said one head member and said body member for preventing the rotation of said one head member while permitting axial movement of said one head member with respect to said body member for removal of said one head member from said body member, and a retaining nut threadedly engageable with said body member for securing said one head member to said body member and whereby torque exerted on said one head member is transmitted to said body member through said interconnecting means, said nut including an inward projecting circular flange delimited by an inner circumferential surface, said flange on said one head member having a maximum diametral dimension less than the diameter of said inner surface, and an axially split two part ring having a portion disposed between and engageable with said respective flanges for securing said one head member to said body member by said nut.

5. A fluid check valve comprising:

a cylindrical tubular body member having a longitudinal bore defining a fluid flow passage;

opposed counterbores formed in said body member at opposite ends of said body member;

a pair of opposed head members removably mounted on opposite ends of said body member, respectively, and each including a longitudinal flow passage adapted to be in communication with said bore in said body member, each of said head members including a cylindrical portion extending into one of said counterbores, and valve seat means on each of said head members and disposed in said bore;

resilient seal means disposed between said cylindrical portions and said counterbores;

a protective wear ring mounted in one of said counterbores and covering said valve seat means on one of said head members; and a closure disc support member removably mounted in the other of said counterbores and supporting a valve closure disc adjacent said valve seat means on the other of said head members for movement between valve open and closed positions.

6. The check valve set forth in claim 5 wherein:

said head members each include means thereon for coupling said check valve to a fluid conduit, said head members being interchangeably mountable on said opposite ends of said body member.

7. The check valve set forth in claim 5 wherein:

said wear ring and said support member are interchangeably retained in said counterbores by said head members, respectively.

8. The check valve forth in claim 5 together with:

a removable wear sleeve disposed in said bore in said body member.

9. A fluid check valve comprising:

a body member including a bore defining a fluid flow passage;

at least one head member removably secured to said body member at one end of said body member, said head member including a longitudinally extending flow passage adapted to be in communication with said bore in said body member;

means on said head member for coupling said valve to fluid conduit means;

valve seat means disposed in said body member;

a closure member pivotally mounted within said body member and operable to be pivoted between an open position and a closed position in engagement with said seat means to prevent fluid flow in one direction through said valve;

pin means projecting axially between said head member and said body member and into recess means on one of said head member and said body member to interconnect said head member and said body member so as to prevent rotation of said head member while permitting axial movement of said head member with respect to said body member for removal of said head member from said body member;

a retaining nut threadedly engageable with said body member for securing said head member to said body member and whereby torque exerted on said head member is transmitted to said body member through said pin means, said nut including an inward projecting circular flange delimited by an inner circumferential surface;

a circumferential flange on said head member having a maximum diametral dimension less than the diameter of said inner surface; and retainer ring means disposed around said head member and having a maximum diamter greater than the diameter of said inner surface, said retainer ring means being releasably mountable between and engageable with said flanges on said head member and said nut for securing said head member to said body member with said nut, said retainer ring means being removable from said head member to permit separation of said head member and said nut upon removal of said head member from said body member.

10. A fluid check valve comprising:

a body member including a central longitudinal bore defining a fluid flow passage, said body member being of a uniform cylindrical tubular configuration and substantially symmetrical with respect to the longitudinal axis of said central bore, valve seat means disposed in said body member, a closure disc pivotally mounted in said body member and operable to be pivoted between an open position and a closed position in engagement with said seat means to prevent fluid flow in one direction through said central bore, opposed counterbore in said body member extending from said central bore toward opposite ends of said body member, respectively, and opposed internally threaded portions of said body member extending toward said counterbores from opposite ends of said body member;

opposed head members removably secured to said body member at opposite ends of said body member, respectively, each of said head members including a longitudinally extending flow passage adapted to be in communication with said central bore, an integral cylindrical portion extending into one of said counterbores from an end of said body member and an externally threaded portion cooperable with an internally threaded portion on said body member adjacent said one counterbore so that said head member can be mounted on and removed from said body member from said end, respectively;

substantially fluid tight seal means formed between each of said head members and said body member along cooperating portions of said counterbores and said cylindrical portions of said head members, respectively, and between said central bore and said threaded portions, respectively;

means on said respective head members for coupling said valve to fluid conduit means; and locknut means disposed on said externally threaded portions of each of said head members and including a portion forcibly engageable with said body member for releasably securing each head member on said body member, respectively.

11. A fluid check valve comprising:

a body member including a central longitudinal bore defining a fluid flow passage, said body member being of a uniform cylindrical tubular configuration with respect to a longitudinal central axis of said bore, valve seat means disposed in said bore, a closure disc pivotally mounted within said bore and operable to be pivoted between an open position and a closed position in engagement with said seat means to prevent fluid flow in one direction through said valve, opposed threaded portions formed on said body member and extending toward each other from opposite ends of said body member, and opposed counterbores extending from said bore toward said opposite ends of said body member, respectively;

a pair of opposed head members removably secured to said body member at opposite ends of said body member, respectively, each of said head members including a longitudinally extending flow passage adapted to be in communication with said bore and an integral cylindrical portion extending into one of said counterbores in said body member, respectively, so that said head members may be mounted on and removed from said body member from said ends of said body member, respectively;

means cooperable with respective ones of said threaded portions on said body member for retaining said head members on said body member, respectively;

substantially fluid tight seal means formed between each of said cylindrical portions of said head members and said counterbores in said body member and between said bore and said threaded portions, respectively; and means on said respective head members for coupling said valve to fluid conduit means.

12. The check valve set forth in claim 11 wherein: said seal means comprise an annular seal ring disposed on one of said body member and said head members, respectively, and in sealing engagement with the other of said members, said seal means forming the only fluid seal points in said body member.

13. The check valve set forth in claim 12 wherein:

said body member includes passage means opening into a fluid flow space between said seal means and said internally threaded portions, respectively for draining fluid from said valve which has leaked past said seal means.

14. The check valve set forth in claim 11 wherein:

said check valve includes a support member for pivotally supporting said closure disc within said bore in said body member, said support member being a separate member removable from said body member.

15. The check valve set forth in claim 11 or 14 wherein:

said seat means comprises an annular surface formed on one of said head members and engageable by said closure disc in the valve closed condition.

16. The check valve set forth in claim 14 wherein:

said support member comprises a generally cylindrical ring retained in said bore by one of said head members.

17. The check valve set forth in claim 16 wherein:

said seat means comprises an annular surface formed on one of said head members and engageable by said closure disc in the valve closed condition.

18. The check valve set forth in claim 15 wherein:

both of said head members include an annular seat surface formed thereon, said head members being interchangeable in said body member.

19. The check valve set forth in claim 16 wherein:

said closure disc includes a radially projecting lug portion disposed between opposed bosses formed on said ring and supported between said bosses by a pivot pin loosely retained in elongated slots formed in said bosses, respectively.

20. The check valve set forth in claim 19 wherein:

said closure disc includes an elastomeric coating formed on the closure face thereof.

21. The check valve set forth in claim 14 wherein:
said seat means includes a removable seat insert mounted on one of said head members and including a generally annular seating surface formed thereon.

22. The check valve set forth in claim 21 wherein:
said seat insert includes means for pivotally supporting said closure disc.

23. The check valve set forth in claim 21 wherein:
said seat insert includes a threaded portion engaged with a cooperating threaded portion on said one head member.

24. The check valve set forth in claim 21 together with:
a removable seat insert mounted on the other head member interchangeable with said seat insert mounted on said one head member.

25. The check valve set forth in claim 11 together with:
a support cradle for said check valve comprising a cylindrical tubular axially split sleeve, a base portion of said cradle fixed to said sleeve and having a flat bottom surface, a pair of opposed bracket portions fixed to said sleeve adjacent to an axial gap formed in said sleeve, and fastener means for drawing said bracket portions toward each other to secure said sleeve to said body member in surrounding relationship thereto.

26. A fluid check valve comprising:
a generally cylindrical tubular body member including a central longitudinal bore defining a fluid flow passage, valve seat means disposed in said bore, a closure disc pivotally mounted within said bore and operable to be pivoted between an open position and a closed position in engagement with said seat means to prevent fluid flow in one direction through said valve, and opposed internally threaded portions extending toward said bore from opposite ends of said body member;

a support member for pivotally supporting said closure disc within said bore in said body member, said support member being a separate member removable from said body member;

a pair of opposed head members removably secured to said body member at opposite ends of said body member, respectively, each of said head members including a longitudinally extending flow passage adapted to be in communication with said bore and an externally threaded portion cooperable with an internally threaded portion on said body member so that said head members may be mounted on and removed from said body member from said ends of said body member, respectively;

said seat means including a removable seat insert mounted on one of said head members and including a generally annular seating surface formed thereon;

a removable wear ring mounted on said other head member at the end of said flow passage in said other head member which opens into said bore;

substantially fluid tight seal means formed between each of said head members and said body member between said bore and said threaded portions, respectively;

means on said respective head members for coupling said valve to fluid conduit means; and locknut means disposed on said externally threaded portions of each of said head members and including a portion forcibly engageable with said body member for locking the threaded connections between said body member and said head member, respectively.

* * * * *